United States Patent
Berry

(10) Patent No.: US 8,063,522 B2
(45) Date of Patent: Nov. 22, 2011

(54) GENERATOR ROTOR GROUND BUSHING

(75) Inventor: Nathan A. Berry, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 194 days.

(21) Appl. No.: 12/558,884

(22) Filed: Sep. 14, 2009

(65) Prior Publication Data

US 2011/0062807 A1    Mar. 17, 2011

(51) Int. Cl.
H02K 11/00    (2006.01)
(52) U.S. Cl. .......................................... 310/71
(58) Field of Classification Search ............. 310/71, 310/261.1
See application file for complete search history.

(56) References Cited

U.S. PATENT DOCUMENTS

| | | |
|---|---|---|
| 4,046,445 A | 9/1977 | Anhalt |
| 4,862,342 A | 8/1989 | Dhyanchand et al. |
| 5,012,177 A | 4/1991 | Dhyanchand et al. |
| 5,550,456 A | 8/1996 | Shekhawat et al. |
| 5,903,130 A | 5/1999 | Rice et al. |
| 6,037,752 A | 3/2000 | Glennon |
| 6,150,741 A * | 11/2000 | Hayashi et al. ............. 310/68 D |
| 6,191,562 B1 | 2/2001 | Mueller et al. |
| 6,232,691 B1 | 5/2001 | Anderson |
| 6,462,429 B1 | 10/2002 | Dhyanchand et al. |
| 6,850,043 B1 | 2/2005 | Maddali |
| 7,459,889 B2 | 12/2008 | Ganev et al. |
| 7,633,198 B2 * | 12/2009 | Kirkman et al. ................. 310/71 |
| 2002/0047360 A1* | 4/2002 | Kaizu ........................ 310/68 D |

FOREIGN PATENT DOCUMENTS

JP    2010-251175 A    11/2010

OTHER PUBLICATIONS

Search Report for Great Britain Application No. GB1014157.0, Jan. 19, 2011.

* cited by examiner

*Primary Examiner* — Nguyen N Hanh
(74) *Attorney, Agent, or Firm* — Carlson, Gaskey & Olds PC

(57) ABSTRACT

A generator includes a rotor structure having a rotor frame that supports field turns and a rectifier assembly. The rotor frame includes an opening, and a bus bar passes through the opening and electrically connects the field turns and the rectifier assembly. A grounding bushing electrically connects the bus bar to the rotor frame.

6 Claims, 2 Drawing Sheets

GENERATOR ROTOR GROUND BUSHING

BACKGROUND

This disclosure relates to a generator rotor and its rotor circuit.

A generator includes a stator fixed relative to a housing and a rotor rotatable about an axis relative to the stator. The rotor includes a rotor frame carrying a rotator circuit that includes field turns and a rectifier assembly, which has diodes. Rotation of the rotor relative to the stator induces an alternating current in the field turns, which is converted to a DC voltage by the rectifier assembly.

Generators can experience rectifier assembly failures due to damaged diodes. One failure mode results from an electrical static discharge event from the rotor frame to the isolated rotor circuit. Typically, the rotor frame has an opening through which a bus bar extends. The bus bar, which is electrically connected to the rotor circuit, is electrically insulated from the rotor frame with an insulator bushing. The isolated rotor circuit builds up a high voltage potential to the rotor frame under some operational parameters. The parasitic capacitances within the isolated rotor circuit discharges to the rotor frame. The voltage across the diodes in the rotor circuit exceeds the diode voltage rating during the discharge event. The reverse bias on the diode breaks down and shorts when the voltage exceeds the avalanche voltage characteristic of the silicone die, thus damaging the rectifier assembly.

SUMMARY

A generator is disclosed that includes a rotor structure having a rotor frame that supports field turns and a rectifier assembly. The rotor frame includes an opening, and a bus bar passes through the opening and electrically connects the field turns and the rectifier assembly. A grounding bushing electrically connects the bus bar to the rotor frame.

These and other features of the disclosure can be best understood from the following specification and drawings, the following of which is a brief description.

DETAILED DESCRIPTION

Figure 1:
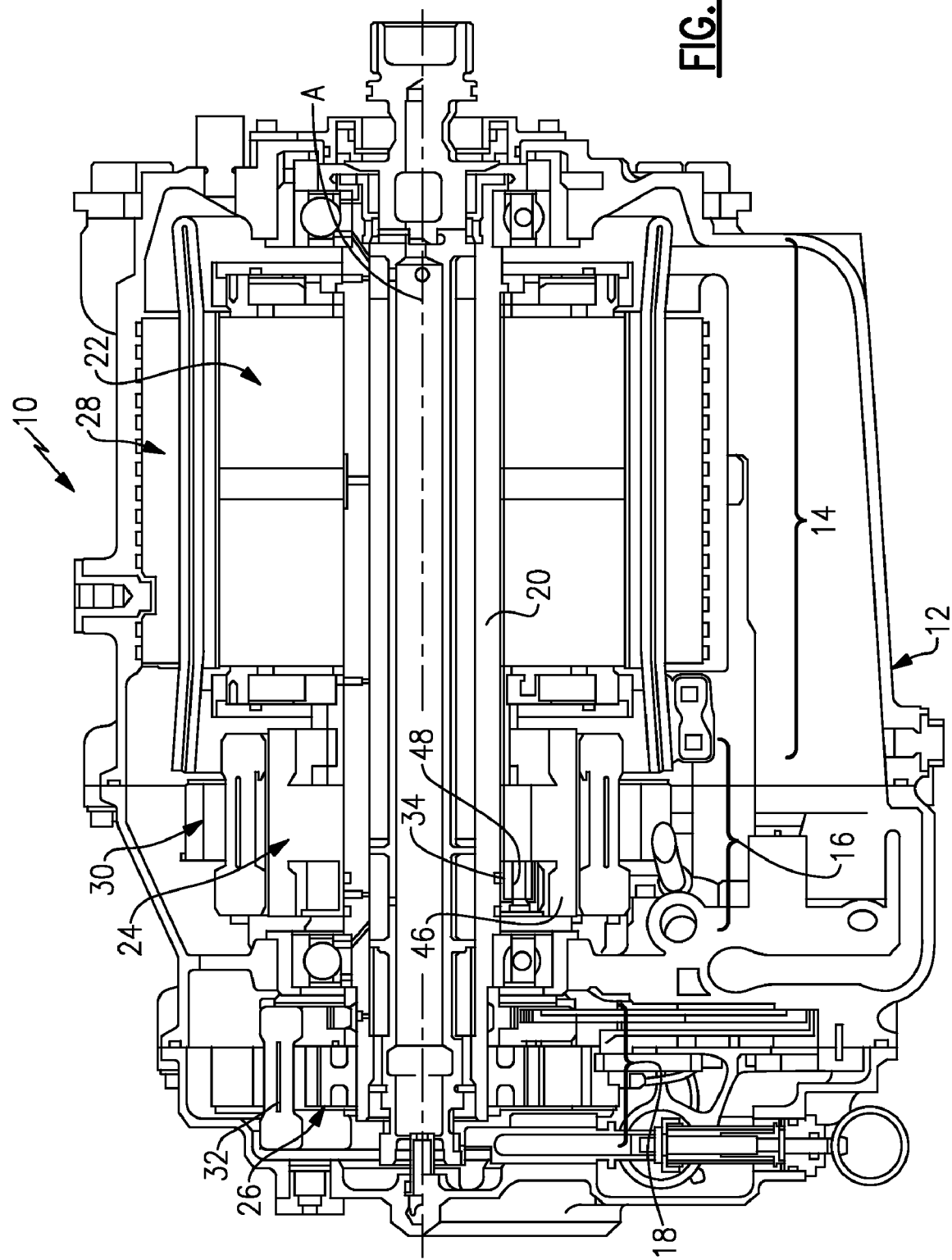
FIG. 1 is a cross-sectional view of a generator.

A generator 10, shown in FIG. 1, is of the kind typically used in aerospace applications. The generator 10 includes main, exciter and permanent magnet generator (PMG) assemblies 14, 16, 18. In one example, the main, exciter and PMG assemblies 14, 16, 18 respectively included first, second (exciter) and third rotors 22, 24, 26 carried on a common shaft 20 rotatable about an axis A. During rotation, the first, second and third rotors 22, 24, 26 respectively cooperate with first, second and third stators 28, 30, 32 to induce an alternating current in each of the main, exciter and PMG assemblies 14, 16, 18.

Figure 2:
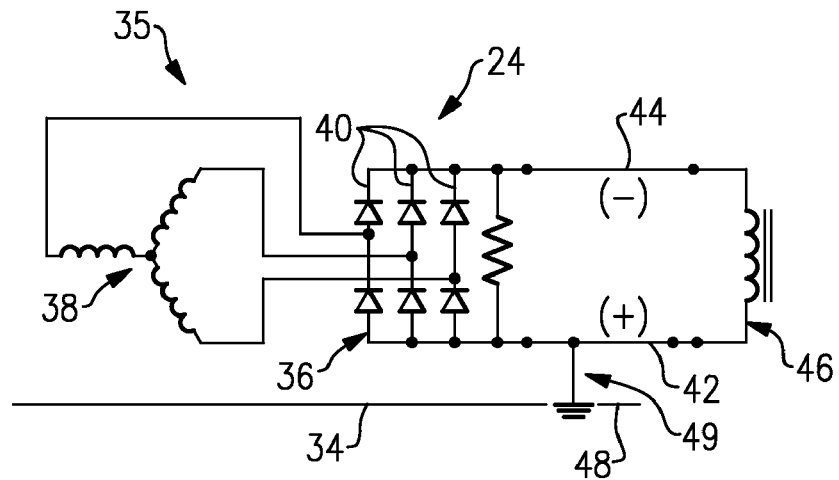
FIG. 2 is a schematic of a rotor for the generator shown in FIG. 1.

The exciter rotor 24 is schematically illustrated in FIG. 2. The exciter rotor 24 includes a rotor frame 34 that supports a rotor circuit 35. Exciter armature turns 38 in the rotor circuit 35 induce an alternating current that passes through a rectifier assembly 36. Diodes 40 in the rectifier assembly 36 rectify the alternating current to provide a DC voltage. Positive and negative bus bars 42, 44 from the rectifier assembly 36 supply the DC voltage to energize main field turns 46. Rotation of the exciter rotor 24 induces an alternating current in the stator 30.

Figure 4:
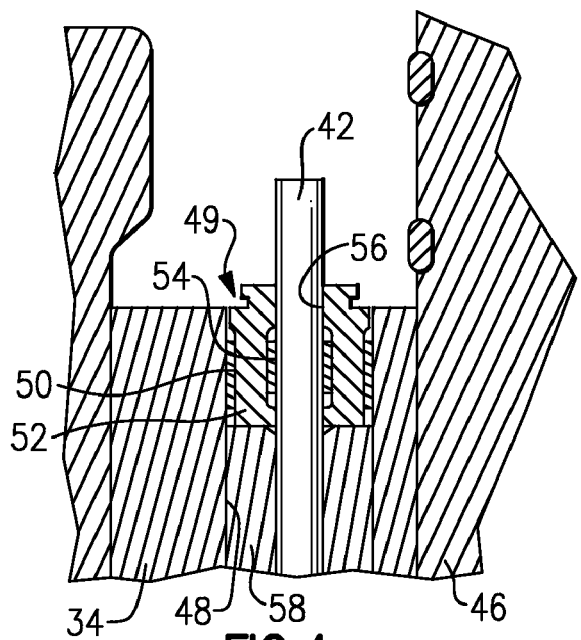
FIG. 4 is a cross-sectional view of the rotor portion shown in FIG. 3.
Figure 3:
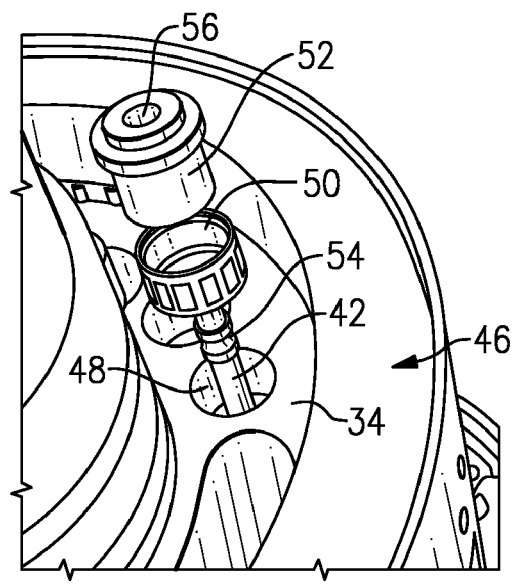
FIG. 3 is a perspective view of a portion of the rotor for the generator shown in FIG. 1.

The positive bus bar 42 passes through an opening 48 in the rotor frame 34. A bushing assembly 49 is arranged within the opening 48 and grounds the positive bus bar 42, which is typically copper, to the rotor frame 34 to prevent the creation of a potential between the rotor circuit 35 and the rotor frame 34. The bushing assembly 49 is shown in more detail in FIGS. 3 and 4.

The bushing assembly 49 includes a metallic grounding bushing 52, which is constructed from aluminum in one example. The grounding bushing 52 supports a copper contact ring 50 at its outer circumference that electrically connects the grounding bushing 52 to the rotor frame 34. The contact ring 50 includes deflectable corrugations that facilitate insertion of the bushing assembly 49 into the opening 48 and maintain solid contact subsequent to its installation. A flexible copper contact band 54 electrically connects the positive bus bar 42 to an inner circumference 56 of the grounding bushing 52. Current can freely flow from the positive bus bar 42 through the bushing assembly 49 to the rotor frame 34 throughout the operation of the generator 10.

The bushing assembly 49 enables the rotor circuit 35 to be at the same potential as the rotor frame 34, preventing the parasitic capacitances within the rotor circuit 49 from building a voltage potential to the rotor frame 34. The static voltage discharge event is eliminated with the bushing assembly 49, thus avoiding a voltage spike across the diodes 40 and elsewhere within the rotor circuit 35. An insulator bushing 58 still may be used between a portion of the positive bus bar 42 and the rotor frame 34 if desired without any adverse affect on the electrical grounding provided by the bushing assembly 49.

Although example embodiments have been disclosed, a worker of ordinary skill in this art would recognize that certain modifications would come within the scope of the claims. For that reason, the following claims should be studied to determine their true scope and content.

What is claimed is:

1. A generator comprising:
    a rotor structure having a rotor frame supporting field turns and a rectifier assembly, the rotor frame including an opening;
    a bus bar passing through the opening and electrically connecting the field turns to the rectifier assembly; and
    a grounding bushing electrically connecting the bus bar to the rotor frame.

2. The generator according to claim 1, wherein the rectifier assembly includes multiple diodes configured to convert an alternating current to a direct current.

3. The generator according to claim 1, comprising exciter armature turns electrically connected to the rectifier assembly and configured to energize the rectifier assembly.

4. The generator according to claim 1, wherein the grounding bushing includes a metallic bushing disposed within the opening and receiving the bus bar.

5. The generator according to claim 4, wherein the grounding bushing includes a contact ring interconnecting the metallic bushing and the rotor frame, and a contact band interconnecting the bus bar and the metallic bushing.

6. The generator according to claim 1, comprising a stator within which a rotor is disposed for rotation about an axis, the rotor including the rotor structure, the rotor configured to induce an alternating current in the stator, and the bushing configured to pass a direct current from the bus bar to the rotor frame.

* * * * *